US010780904B2

(12) United States Patent
Tione

(10) Patent No.: US 10,780,904 B2
(45) Date of Patent: Sep. 22, 2020

(54) METHOD FOR CONTROLLING AND POSSIBLY RECOVERING THE ADHESION OF THE WHEELS OF A CONTROLLED AXLE OF A RAILWAY VEHICLE

(71) Applicant: FAIVELEY TRANSPORT ITALIA S.P.A., Piossasco (Turin) (IT)

(72) Inventor: Roberto Tione, Lauriano (IT)

(73) Assignee: FAIVELEY TRANSPORT ITALIA S.P.A., Piossasco (Turin) (IT)

(*) Notice: Subject to any disclaimer, the term of this patent is extended or adjusted under 35 U.S.C. 154(b) by 14 days.

(21) Appl. No.: 16/090,362

(22) PCT Filed: Apr. 3, 2017

(86) PCT No.: PCT/IB2017/051887
§ 371 (c)(1),
(2) Date: Oct. 1, 2018

(87) PCT Pub. No.: WO2017/175108
PCT Pub. Date: Oct. 12, 2017

(65) Prior Publication Data
US 2019/0111951 A1 Apr. 18, 2019

(30) Foreign Application Priority Data
Apr. 5, 2016 (IT) .................. 102016000034535

(51) Int. Cl.
*B61L 3/00* (2006.01)
*B60T 8/17* (2006.01)
(Continued)

(52) U.S. Cl.
CPC ............. *B61L 3/006* (2013.01); *B60T 8/174* (2013.01); *B60T 8/1705* (2013.01);
(Continued)

(58) Field of Classification Search
CPC ...... B61L 3/006; B61L 3/008; B61L 15/0072; B60T 8/1705; B60T 8/174; B60T 8/17616
(Continued)

(56) References Cited

U.S. PATENT DOCUMENTS 5,424,948 A 6/1995 Jordan, Jr.
6,208,097 B1 * 3/2001 Reddy .................. B60L 3/10
180/197

(Continued)

FOREIGN PATENT DOCUMENTS

EP 1935732 A1 6/2008
EP 2147840 A1 1/2010
WO 2006113954 A1 2/2006

OTHER PUBLICATIONS

B. Widrow and S.D. Steams, Adaptive Signal Processing, New Jersey, Prentice-Hall, Inc., 1985.
(Continued)

*Primary Examiner* — Atul Trivedi
(74) *Attorney, Agent, or Firm* — Christopher R. Carroll; The Small Patent Law Group LLC

(57) ABSTRACT

A method for controlling and recovering the adhesion, during a slipping phase, of wheels ($W_i$) belonging to at least two controlled axles ($A_i$) of a railway vehicle, comprising the steps of: generating speed signals indicative of the angular speed ($\omega_i$) of said wheels ($W_i$); estimating the value of the instantaneous adhesion ($\mu(T_j)$) at the point of contact of such wheels ($W_i$) and the rails, using an adhesion observer; generating a target-slip value ($\delta$) for the wheels ($W_i$) of the controlled axles ($A_i$) by means of an optimization algorithm which processes the estimated adhesion values ($\mu_i(T_j)$), and modifying the target-slip value continuously in time, with a predetermined sampling period, such as to maximize the average value of the adhesion of the wheels of the vehicle.

12 Claims, 9 Drawing Sheets

(51) Int. Cl.
*B60T 8/174* (2006.01)
*B60T 8/1761* (2006.01)
*B61L 15/00* (2006.01)

(52) U.S. Cl.
CPC .......... *B60T 8/17616* (2013.01); *B61L 3/008* (2013.01); *B61L 15/0072* (2013.01)

(58) Field of Classification Search
USPC .......................................................... 701/20
See application file for complete search history.

(56) References Cited

U.S. PATENT DOCUMENTS

| | | | | |
|---|---|---|---|---|
| 6,236,954 | B1* | 5/2001 | Thomas | B60T 8/172 |
| | | | | 702/142 |
| 2005/0189886 | A1* | 9/2005 | Donnelly | B61C 15/08 |
| | | | | 318/52 |
| 2006/0273657 | A1* | 12/2006 | Wanke | B60T 8/17555 |
| | | | | 303/146 |
| 2007/0001629 | A1* | 1/2007 | McGarry | B61C 15/14 |
| | | | | 318/52 |
| 2008/0116739 | A1* | 5/2008 | Lang | B60T 8/172 |
| | | | | 303/15 |
| 2008/0137062 | A1* | 6/2008 | Holton | G01P 3/366 |
| | | | | 356/28 |
| 2008/0319611 | A1* | 12/2008 | Song | B60T 8/172 |
| | | | | 701/41 |
| 2010/0324766 | A1* | 12/2010 | Linda | B60W 40/076 |
| | | | | 701/22 |
| 2013/0082626 | A1* | 4/2013 | Daigle | B60L 3/104 |
| | | | | 318/52 |
| 2013/0103279 | A1* | 4/2013 | Asano | B60T 8/1755 |
| | | | | 701/72 |
| 2013/0238176 | A1* | 9/2013 | Watanabe | B60L 15/20 |
| | | | | 701/20 |
| 2013/0320900 | A1* | 12/2013 | Daigle | B60L 3/104 |
| | | | | 318/434 |
| 2014/0039767 | A1* | 2/2014 | Jensen | E02F 9/2079 |
| | | | | 701/50 |
| 2016/0003408 | A1* | 1/2016 | Stuble | F16M 11/42 |
| | | | | 248/349.1 |
| 2017/0023114 | A1* | 1/2017 | Wang | B60K 23/04 |
| 2018/0281759 | A1* | 10/2018 | Rasel | B60T 8/1705 |
| 2019/0111787 | A1* | 4/2019 | Tione | B60L 3/108 |

OTHER PUBLICATIONS

International Search Report for PCT/IB2016/057813 dated Apr. 5, 2017.

* cited by examiner

//]: #

METHOD FOR CONTROLLING AND POSSIBLY RECOVERING THE ADHESION OF THE WHEELS OF A CONTROLLED AXLE OF A RAILWAY VEHICLE

CROSS-REFERENCE TO RELATED APPLICATIONS

This application is the U.S. National Stage Application of International Patent Application No. PCT/IB2017/051887, filed on Apr. 3, 2017, which claims priority to Italian Patent Application No. 102016000034535, filed on Apr. 5, 2016, the contents of each of which is incorporated herein by reference in its entirety.

FIELD OF TECHNOLOGY

The present invention relates to a method for controlling the adhesion of the wheels of controlled axles of a railway vehicle.

BACKGROUND

Electronic systems are installed on board of most modern rail vehicles which typically include wheel slide control subsystems, adapted to intervene both when the vehicle is in the traction phase and when it is in the braking phase. These subsystems are known as anti-skid or anti-slide systems, or also WSP (Wheel Slide Protection) systems.

A system for controlling the adhesion of the wheels, with an anti-skid function, according to the prior art, is schematically represented in FIG. 1 of the accompanying drawings, which refer to a vehicle with n controlled axles A1, A2, . . . , An. The axles A1, A2, . . . , An comprise a respective shaft S1, S2, . . . , Sn and a respective pair of wheels W1, W2, . . . , Wn integral in rotation to it.

In the drawings, generally only one wheel of each axle is illustrated.

The WSP system of FIG. 1 comprises an electronic control unit ECU, typically based on microprocessor architecture, that receives tachometer signals relating to the angular speed of each axle A1, A2, . . . An from sensors SS1, SS2, . . . , SSn respectively associated to these axles. The electronic control unit ECU is also connected to the torque control apparatuses TC1, TC2, . . . , TCn, each associated to a respective axle A1, A2, . . . , An.

The electronic control unit ECU is provided to operate a modulation of the torque applied to each axle according to a predetermined algorithm if, in the case of applying torque during traction or braking phase in a degraded adhesion situation, the wheels of one or more axles end up in a possible incipient slipping condition. Torque modulation is implemented in such a way as to prevent a total locking of the axles, possibly so as to bring each axle into a situation of controlled slipping in view of recovering adhesion and in any case for the entire duration of the degraded adhesion situation.

FIG. 2 shows a block diagram illustrating an adhesion control/recovery system for a generic axle: the error or difference $E(t)$ between the reference speed value $V_R(t)$ at which one wishes to slide the controlled axle A and the measured speed $V_M(t)$ detected by the associated sensor SS and conditioned by an acquisition and processing module APM is applied as an input signal to a control module CM, which outputs a drive signal $Y(t)$ to the torque control apparatus TC associated with the axle A.

The reference velocity $V_R(t)$ is obtained as a fraction of the instantaneous speed of the vehicle, for example, according to the expression:

$$V_s(t) = V_v(t) \cdot (1-\delta) \quad (1)$$

where $V_v(t)$ is the instantaneous (detected) speed of the vehicle, $\delta$ represents the relative slip of the axle A to be obtained during the slipping phase.

As will be appreciated better from the following description, the optimization over time of the relative slip value $\delta$ represents one of the main objects of the present invention.

FIG. 3 illustrates by way of non-limiting example a possible embodiment of the torque control apparatus TC. Such apparatus comprises an electronic adjustment and drive unit 300, which controls a solenoid valve unit 301 including a charging solenoid valve 302 and a discharging solenoid valve 303. In the embodiment illustrated, these solenoid valves are three-way valves with two positions. The solenoid valve 302 is normally open, and the solenoid valve 303 is normally closed.

The output of the charging solenoid valve 302 is coupled, in a manner known per se, to a brake cylinder 304 associated to the axle A.

Under the control of the electronic unit 300, the valve unit 301 allows to selectively reduce, maintain or increase the command pressure supplied to the brake cylinder 304, within values comprised between the atmospheric pressure and the braking pressure coming from a conduit 313 connected to the charging solenoid valve 302. The unit 300 may be predisposed to control the pressure to the brake cylinder 304 in open loop, delegating the closure of the control loop to a speed loop according to FIG. 2, or to control said pressure in closed loop through a feedback achieved through the use of a pressure sensor 305.

An electric motor 306 is associated with the axle A able to apply to such axle a traction or braking torque, in accordance with a request for torque 307 applied to an inverter 308 that drives said electric motor. The torque to be applied to the axle A by means of the motor 306 corresponds to a torque request 310, modified by a correction torque 311, variable between zero and the value of the torque 310. The torque 307 is positive in case of traction and negative in case of braking.

A blending module 312, in case of slipping during braking, "blends" the torque modulation request applied to the axle A between the pneumatic system and the regenerative electrodynamic system, according to a predetermined manner.

The torque control apparatus illustrated in FIG. 3 may be realised according to many variants known to a man skilled in the art. For example, in the case of hauled railway vehicles, or those satisfying UIC regulations, which typically have pneumatic-type anti-slip systems completely isolated from the traction systems, the unit 300 is not driven by the blending module 312 through a modulation request 313, as is illustrated in FIG. 3, but rather directly by the control module CM of FIG. 2 through a torque modulation request 314 illustrated with a dashed line in FIG. 3.

The adhesion coefficient $\mu(\delta)$ between wheels and rails varies according to the slip $\delta$ substantially in the way illustrated in FIG. 4. Based on the expression (1) above, $\delta$ may be expressed as $$\delta = \frac{V_v - V_r}{V_v} \quad (1')$$

with $0 \le V_r \le V_v$ and $0 \le \delta \le 1$.

In FIG. 4, the curves 1, 2 and 3 qualitatively represent the trend of the adhesion according to the environmental conditions: curve 1 corresponds to an adhesion condition in dry contact conditions between the wheels and rails, curve 2 corresponds to an adhesion condition in the presence of moisture between the wheels and rails, and curve 3 represents an adhesion condition in the presence of viscous material between the wheels and rails, such as oil or rotten leaves (typical condition in the autumn period), or even rust mixed with moisture (typical condition in railway depots).

It has been found experimentally that the values of $\delta$ at the adhesion peaks $a_1$, $a_2$, $a_3$ change on varying of the adhesion conditions, moving along a curve as indicated with A in FIG. 4.

FIG. 5 is a diagram illustrating forces applied to a wheel of an axle A. From this figure, it is clear that:

$$F_m \cdot R = F_A \cdot R - J \cdot \dot{\omega} \quad (2)$$

where:

$$F_A = \mu \cdot m \cdot g \quad (3)$$

for which:

$$F_m = \mu \cdot m \cdot g - J/R \cdot \dot{\omega} \quad (4)$$

where $F_m$ is the tangential force applied to a wheel by the traction and/or braking system, R is the radius of the wheel, J is the axle's moment of inertia, m is the mass applied to the wheel-rail contact point, $\dot{\omega}$ is the instantaneous angular acceleration of the axle.

It is clear that at the same instantaneous angular acceleration, the maximum applicable force $F_m$ is obtained in correspondence of the maximum adhesion value $\mu$, i.e. in correspondence with the points lying on the curve A of FIG. 4.

If one decides to slip the axle in conditions corresponding for example to point b in FIG. 4, the value of the force $F_m$ available is reduced as a result of the reduction of the adhesion value $\mu$, but an energy injection phenomenon is obtained at the wheel-rail point of contact proportional to the slip (difference) between the vehicle speed $V_v$ and the tangential speed $V_r$ of the wheel, with a power (energy injected per unit of time):

$$P(\delta) = F_A(\delta) \cdot (V_v - V_r) = \mu(\delta) \cdot m \cdot g \cdot (V_v - V_r) = \mu(\delta) \cdot m \cdot g \cdot \delta V_v. \quad (5)$$

The expression (5) above indicates how by increasing $\delta$ an increase of the power applied to the wheel-rail point of contact is obtained. Such injection of energy causes an overheating of the wheel with a consequent cleaning effect of the point of contact, improving the instantaneous adhesion value for the next wheel.

It is moreover known that in the case of moisture or rain, significant cleaning effects are obtained, whereas in the presence of lubricants or rotten leaves, the cleaning effect is less pronounced.

The current systems for recovering adhesion between the wheels and rails impose a fixed slip value $\delta$, typically between 0.2 and 0.3, the specific value being calibrated in a definitive way during the vehicle approval tests. The selected value of $\delta$ is therefore optimized for the type of lubricant used to cause the skidding condition during testing, as prescribed for example in EN 15595, :2009+A1, Railway Applications-Braking-Wheel Slide Protection, para. 6.4.2.1. It is therefore not optimal for all types of materials that may cause conditions of slipping during the normal service of the vehicle.

The graph of FIG. 6A shows in a qualitative way how the global adhesion peak of a vehicle with four axles varies according to the change in $\delta$: by bringing all the axles to slide with adhesion corresponding to the value $\delta_1$, as in FIG. 6A, there is practically no cleaning factor, and therefore the four adhesion curves corresponding to the four wheels substantially coincide with each other and each axle takes advantage of the maximum adhesion peak value $\mu(\delta_1)$.

If instead one causes the axles to slide with an adhesion corresponding to the slip $\delta_2$ as in FIG. 6B, a high-cleaning factor will be obtained: only the $\mu_1$ curve corresponding to the first axle of the vehicle (in the direction of travel) will remain the same and equivalent to that of FIG. 6A, while the curves corresponding to subsequent axles will have increasing adhesion values due to the effect of cleaning achieved by the previous axle. The $\mu(\delta_2)$ value for each axle is indeed lower than the corresponding value of $\mu(\delta_1)$.

As is qualitatively shown in FIG. 6C, in the range of $\delta 1 \leq \delta \leq \delta 2$, a peak value of average global adhesion $\bar{\mu} = \Sigma_1^n \mu(\delta)/n$ (6) exists.

What is described above applies, by extension, to a vehicle or convoy with n axles.

Since the curves which express the adhesion $\mu$ according to the slip function $\delta$ cannot be formulated mathematically in an analytical way and vary continuously according to the conditions that cause the skidding, the geometry of the contact point and the external environmental conditions, it is not possible a priori, to compute analytically the value of $\delta$ of optimal slip.

However, any excellent system for controlling and possibly recovering adhesion should be able to analyze the instantaneous adhesion conditions in real time and verify the trend according to the change in $\delta$ and identify the value of $\delta$ such as to maximize $\bar{\mu} = \Sigma_1^n \mu(\delta)/n$. This value is that which allows the maximum recovery of adhesion in case of skidding, i.e. the value that minimizes the stopping distance in the event of braking in a degraded adhesion condition.

In order to remedy the problems described above, EP 2 147 840 A describes an adaptive control procedure, implemented in discrete mode over time with successive stages, based on the static monitoring of the braking pressure values initially obtained for a $\delta$ value equal to 0.7 for a predetermined time, for example 5 seconds. A $\delta$ value is then selected from among three possible predetermined values, and this $\delta$ value is kept constant at the new value for another predetermined time interval, for example, 10 seconds.

At the end of the total period of 15 seconds, $\delta$ is returned to the initial value (0.7) and a new monitoring-decision cycle is started. The method described in this document is relatively simple and poses reduced computational requirements to the system. However, it causes jumps in the slip speed corresponding to the jumps in $\delta$, which are liable to cause instantaneous acceleration swings and a high consumption of compressed air.

Moreover, this method allows one to identify variations of $\delta$ in the skidding in a discrete mode over time, with a period equal to 15 seconds. Lower periods can be set, but at the expense of a further increased consumption of compressed air and more frequent swings in the instantaneous acceleration. In addition, the continuous repetition of the process may be useless when the environmental conditions do not change substantially during skidding.

WO 2006/113954 A describes a slip control for railway vehicles, implemented in a continuous manner over time, which requires the identification, in optimal adhesion conditions, of the parameters necessary in view of the subsequent desired performance in skidding conditions. This method further requires the global deceleration of the system to be known.

Furthermore, the process of adjusting the optimum slip values requires significantly long times. As this adjustment process is implemented at the beginning of a skid phase, i.e. when the vehicle is traveling at high speed, the space covered by the latter is increased considerably.

SUMMARY

One object of the present invention is to propose an improved method for controlling and possibly recovering the adhesion of the wheels of a controlled axle of a railway vehicle.

This and other objects are achieved according to the invention with a method for controlling and possibly recovering adhesion of the wheels of at least two controlled axles of a railway vehicle, comprising the operations of:
  generating speed signals indicative of the angular speed of the wheels of said at least two controlled axles;
  evaluating the value of the instantaneous adhesion at the point of contact between the wheels of said at least one axle and the rails, using an adhesion observer;
  generating a target-slip value for the wheels of said at least two axles, to be assigned through a predetermined algorithm, which processes the estimated adhesion values, and modifying said target-slip value continuously over time, with a predetermined sampling period, so as to maximize the average value of the adhesion of the wheels of the vehicle.

BRIEF DESCRIPTION OF THE DRAWINGS

Further features and advantages of the invention will become apparent from the detailed description that follows, provided by way of non-limiting example with reference to the accompanying drawings, in which.

DETAILED DESCRIPTION

As will appear more clearly from the following, the method according to the present invention allows the optimum value of the slip δ(t) to be identified, which allows the adhesion value obtained as the average value between the instantaneous adhesion of all the axles to be maximized, this average value being defined as follows:

$$\bar{\mu}(t) = \Sigma_1^n \mu_n(\delta,t)/n \quad i=1,2,\ldots,n \tag{7}$$

The method according to the present invention intervenes at the beginning of a skidding phase and corrects said optimum value of δ(t) in real time and continuously over time, adapting it to the possible variations of the values $\mu_i(\delta,t)$ (adhesions of the i controlled axles) which may intervene in the course of skidding so as to tend to maintain the average value $\bar{\mu}(t)$ in all circumstances at the maximum value.

The method according to the present invention uses an adhesion observer to evaluate in real time the adhesion value μ at the point of contact between the wheels and rails for one or more axles during a skidding phase and, by processing these μ values in real time, identifies continuously over time the optimal δ value to be assigned to a slip control system to obtain the greatest global adhesion recovery.

Figure 1:
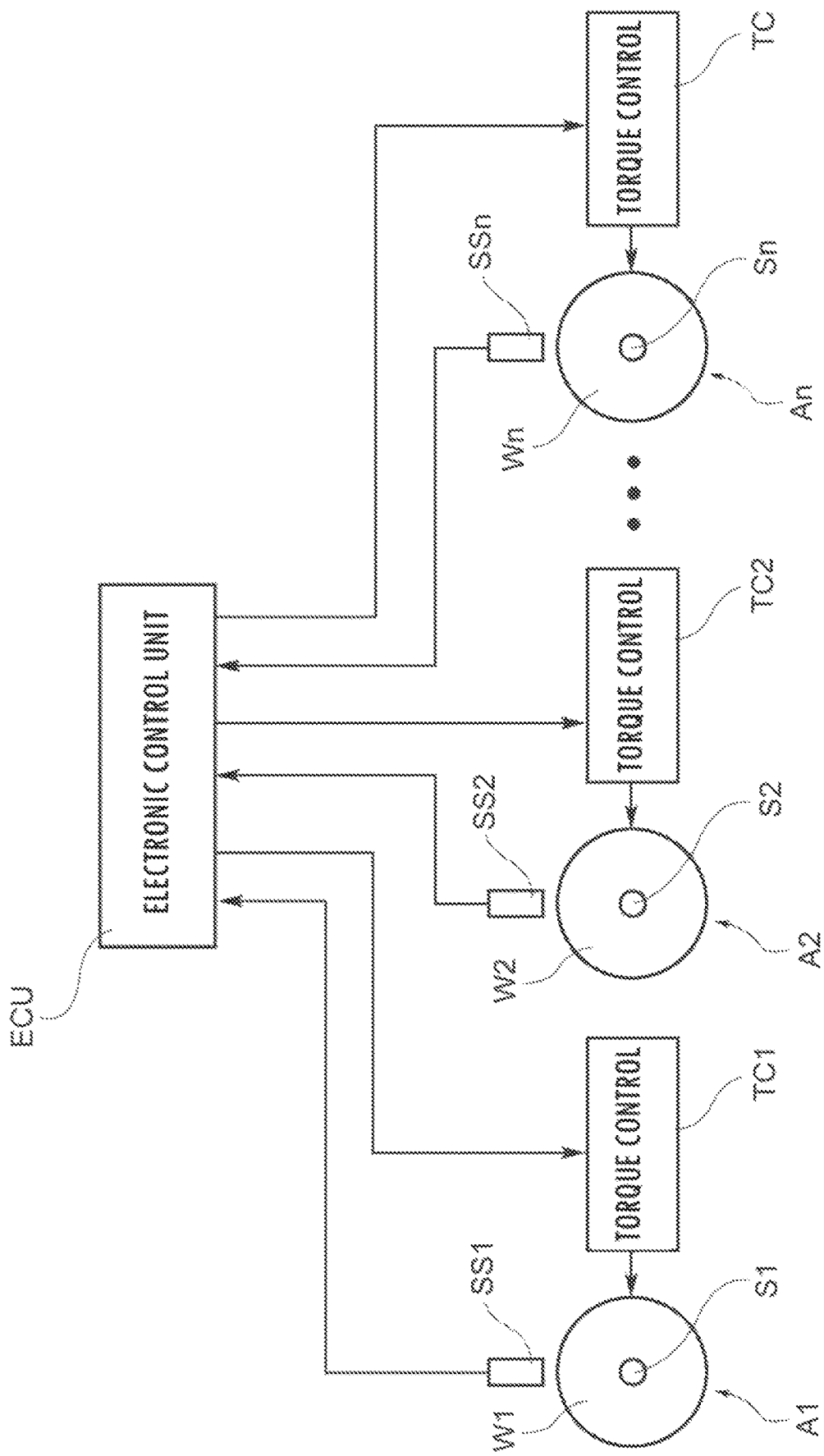
FIG. 1 is a block diagram of an anti-skid control system of the wheels of a railway vehicle.
Figure 2:
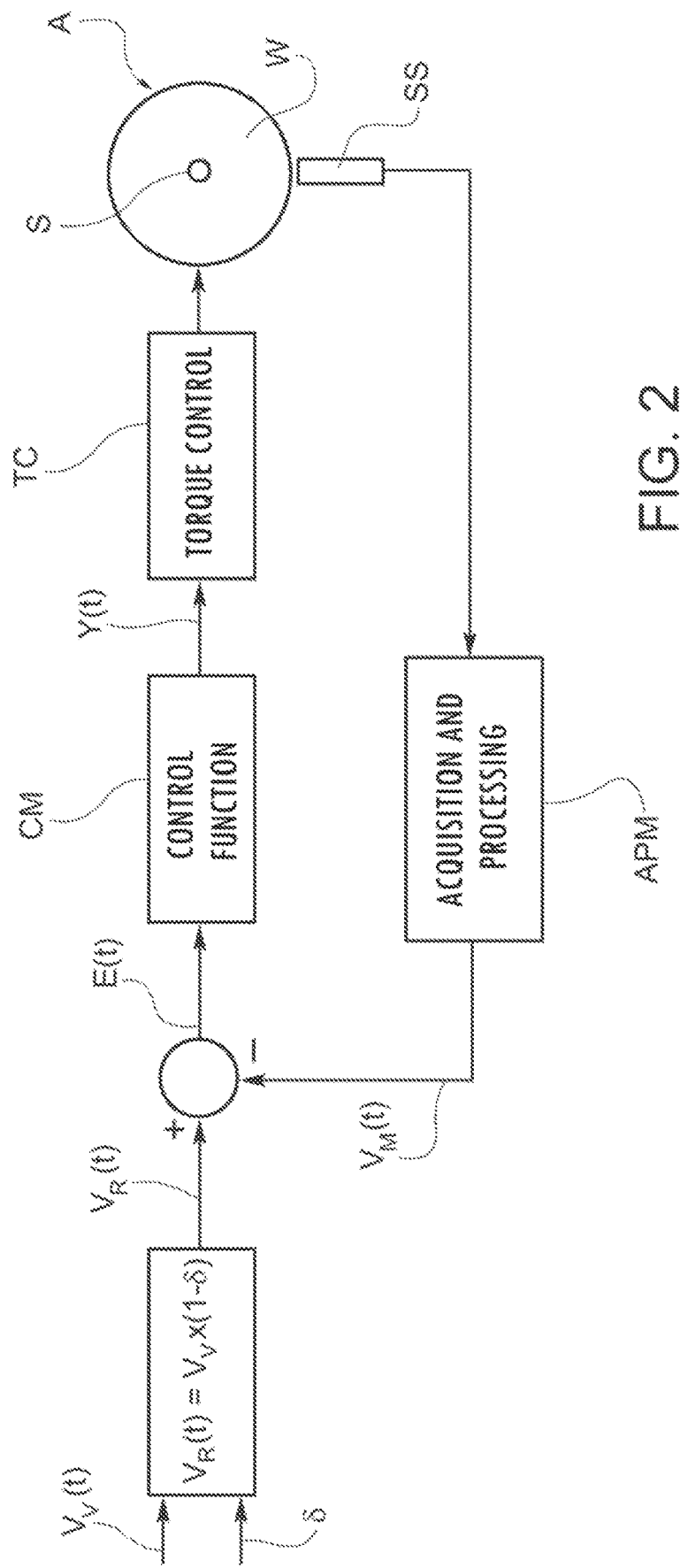
FIG. 2 is a block diagram of a closed loop control system of an axle's rotation speed.
Figure 5:
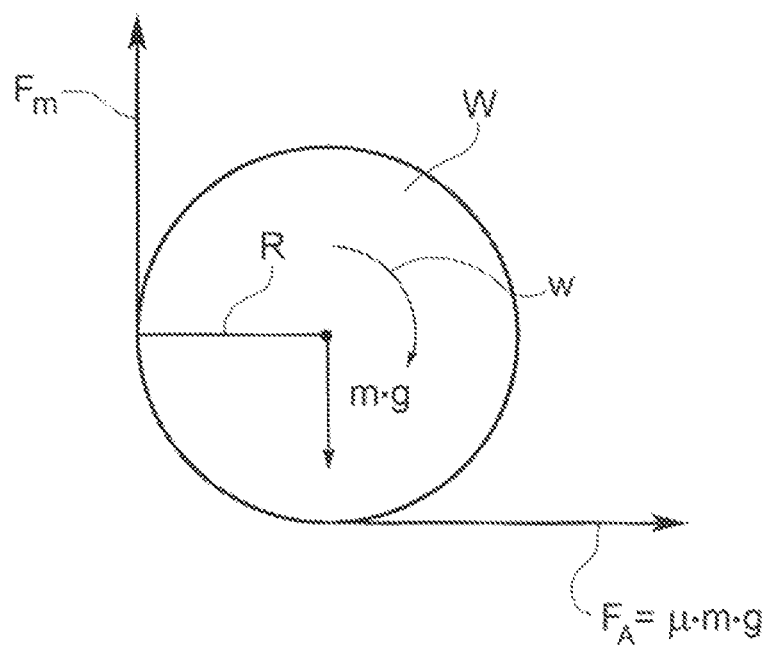
FIG. 5 is a diagram illustrating the forces applied to an axle's wheel.

An adhesion observer adapted to dynamically identify the instantaneous value $\mu(T_j)$ of the adhesion in a generic sampling period $T_j$ of a predetermined duration T at the wheel-rail point of contact during skidding is definable using the equations provided above, from which with some simple steps the following relationship is obtained:

$$\mu(T_j) = \frac{1}{m \cdot g} \cdot [F_m(T_j) + J/R \cdot \dot{\omega}(T_j)] \tag{8}$$

where
  $\dot{\omega}$ is the angular acceleration of the axle, i.e. the time derivative of the angular speed ω of the axle; the value of this acceleration is already available in real time within a control and adhesion recovery system, because angular acceleration is one of the variables on which the control function implemented by the block CM of FIG. 2 is normally based for achieving the slip control of the axle; the sign of $\dot{\omega}$ depends on the instantaneous acceleration or deceleration condition of the axle;
  m is the mass on the wheel-rail point of contact; in the latest generation trains, the m value is known in real time, as it is commonly available to the system that computes the accelerating/braking force to apply to the axle to obtain the desired accelerations/decelerations;
  J is the moment of inertia of the axle and is a parameter whose value is always known, being supplied by the manufacturer of the carriages, as it is fundamental for the computation of stopping distances;
  $F_m$, already defined above in relation to FIG. 5, can be obtained by multiplying the pressure applied to the brake cylinder, known to the braking system, for pressure/force conversion coefficients typical of the brake cylinder, as well as the transmission and efficiency coefficients of the levers and of the coefficient of the friction between the brake linings and discs (in the case of disc brakes); in the case of electrodynamic type traction or braking, the value of the force $F_m$ may be obtained from the electric current value supplied/regenerated by the motor in traction or, respectively, in braking; in the case of so-called "blended" braking, the intensity of the force $F_m$ may be determined as the sum of the respective contributions of the pneumatic brake and of the electrodynamic brake, appropriately weighed with respective coefficients; and $T_j$ is the generic j-th value for the sampling period of the system with which the adhesion observer and more generally the method according to the invention is carried out; in the description that follows, $T_j$ will replace the use of the variable t representing time.

Downstream of the adhesion observer, a low-pass type filter may appropriately be provided, to remove or at least mitigate instantaneous variations and noise present outside of the frequency band useful for a correct observation of the adhesion values.

Figure 7:
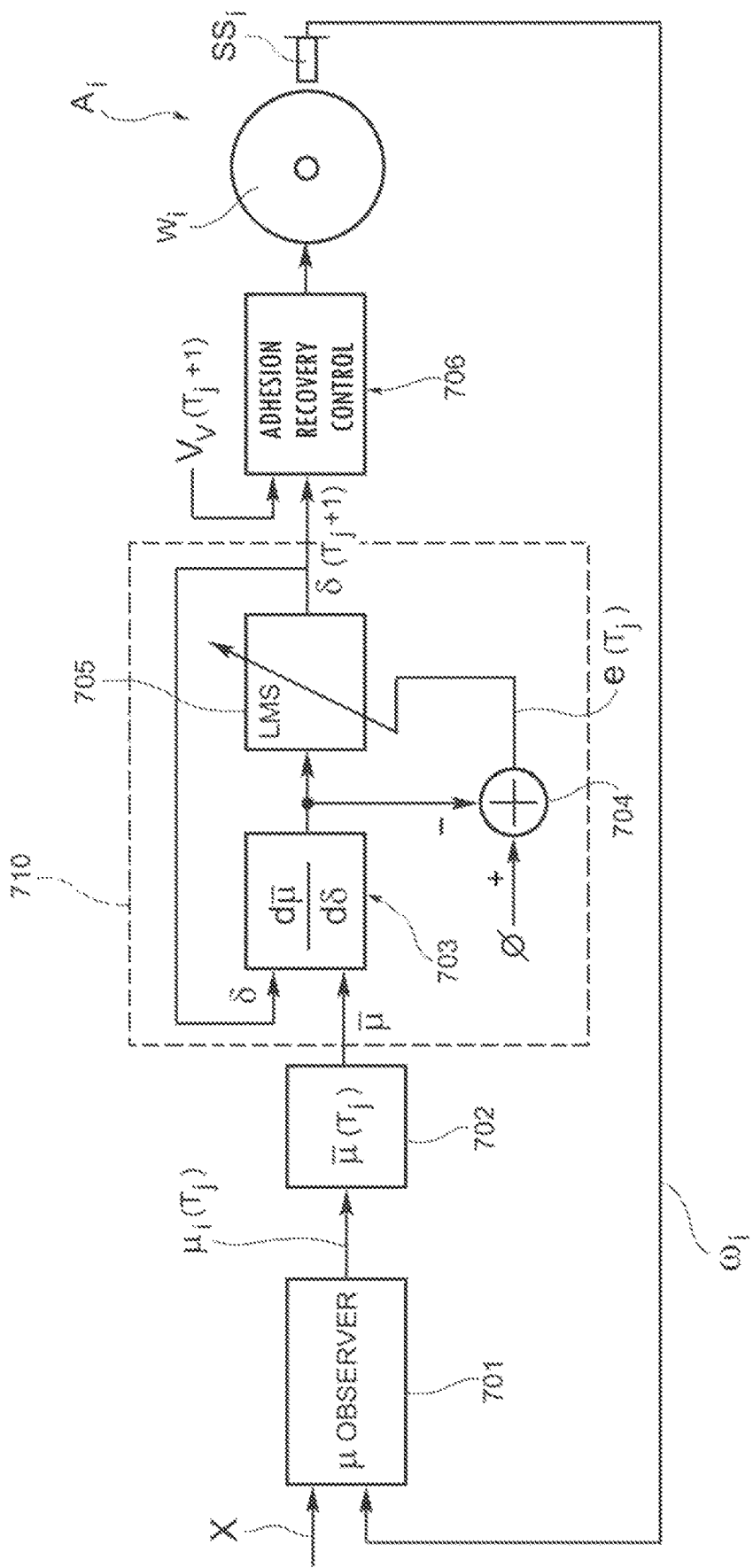
FIG. 7 is a block diagram of a system for implementing a method according to the present invention.

A first embodiment of a system for implementing a method according to the present invention is illustrated in FIG. 7.

Figure 6A:
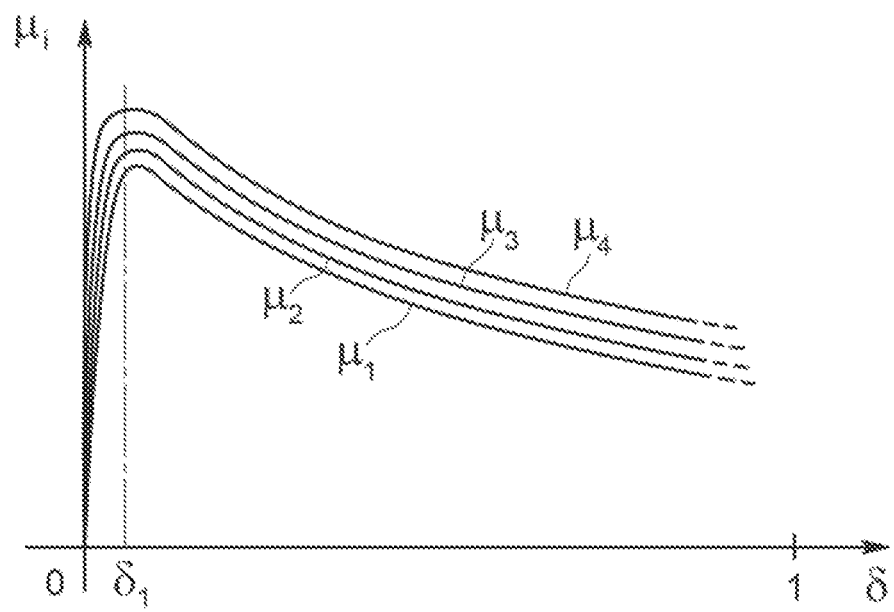
FIGS. 6A, 6B are graphs showing qualitatively the trends of the adhesion coefficient μ of the wheels of four axles of a vehicle in two different operating conditions.
Figure 6B:
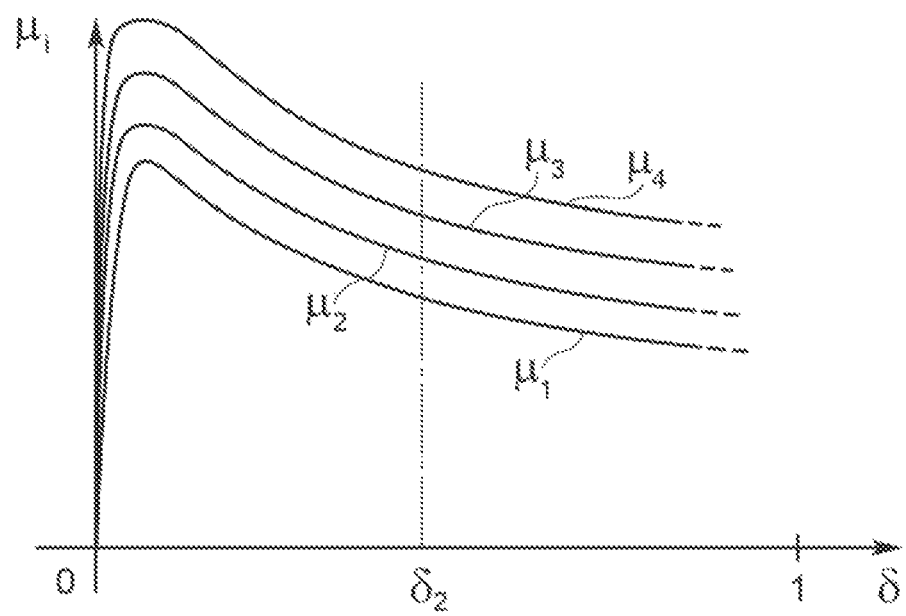
Figure 6C:
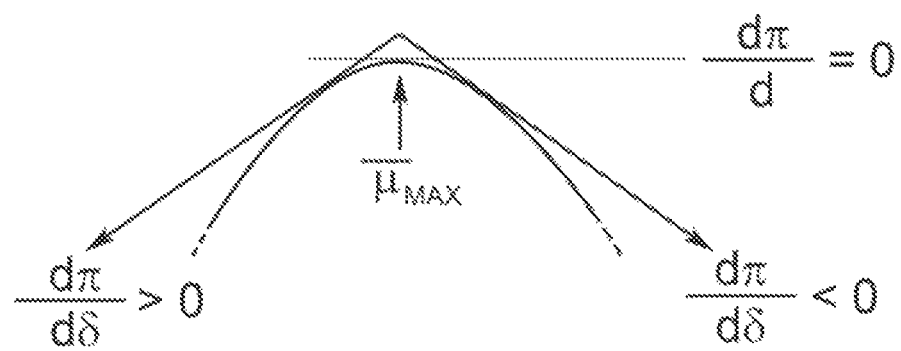
FIG. 6C illustrates the trend of an average adhesion curve $\bar{\mu}$ around the peak value.

The method provides for identifying and tracking the slip value $\delta$ such that the curve $\bar{\mu}(\delta)$ illustrated in FIG. 6C presents the maximum value, i.e. the $\delta$ value for which $$\frac{d\bar{\mu}(T)}{d\delta(T)} = 0.$$

For this purpose, a system implementing an LMS algorithm (Least Mean Square) may be used. For an accurate description of the general characteristics of the convergence criteria and the implementation variants of LMS algorithms, please refer to the available literature and in particular to the text: B. Widrow, S. D. Stearns, "Adaptive Signal Processing", New Jersey, Prentice-Hall, Inc., 1985.

With reference to FIG. 7, an adhesion observer 701 receives input signals representative of the speed values of ω1, ω2, . . . , ωn of the wheels W1, W2, . . . , Wn of controlled axles A1, A2, . . . , An, together with a vector containing the values of the magnitudes $m_i(T_j)$, $J_i$, $R_i$ and $F_{mi}(T_j)$ previously described for the estimation of the instantaneous adhesion values of $\mu_i(T_j)$ relating to the axles $A_i$ (with i=1, 2, . . . , n).

The output of the adhesion observer 701 is connected to the input of a module 702 which computes, based on the estimated instantaneous adhesions values $\mu_i(T_j)$, the average value $\bar{\mu}(T_j)$.

A subsequent differentiator module 703 computes the value of $$\frac{d\bar{\mu}}{d\delta},$$

for example, according to the equation:

$$\frac{d\bar{\mu}(T_j)}{d\delta(T_j)} = \frac{\bar{\mu}(T_j) - \bar{\mu}(T_{j-1})}{\delta(T_j) - \delta(T_{j-1})} \quad (9)$$

An adder 704 outputs the error $e(T_j)$ as the difference between the desired value (0) of said derivative and its instantaneous value corresponding to the equation (9) given above. The error $e(T_j)$ is used to drive and adapt the LMS algorithm implemented in a block 705. This block outputs the target value $\delta(T_{j+1})$.

The value $\delta(T_{j+1})$ is supplied, together with the updated value of the speed $V_v$ of the vehicle, to a plurality of adhesion recovery control blocks 706, one for each axle $A_i$, each having, for example, the architecture illustrated in FIG. 2 described above.

The module 705 that implements the LMS algorithm continuously implements the correction of the output, i.e. the δ value, in order to minimize or cancel the error e(T), i.e. up to the cancellation of $$\frac{d\bar{\mu}}{d\delta}.$$

Figure 8:
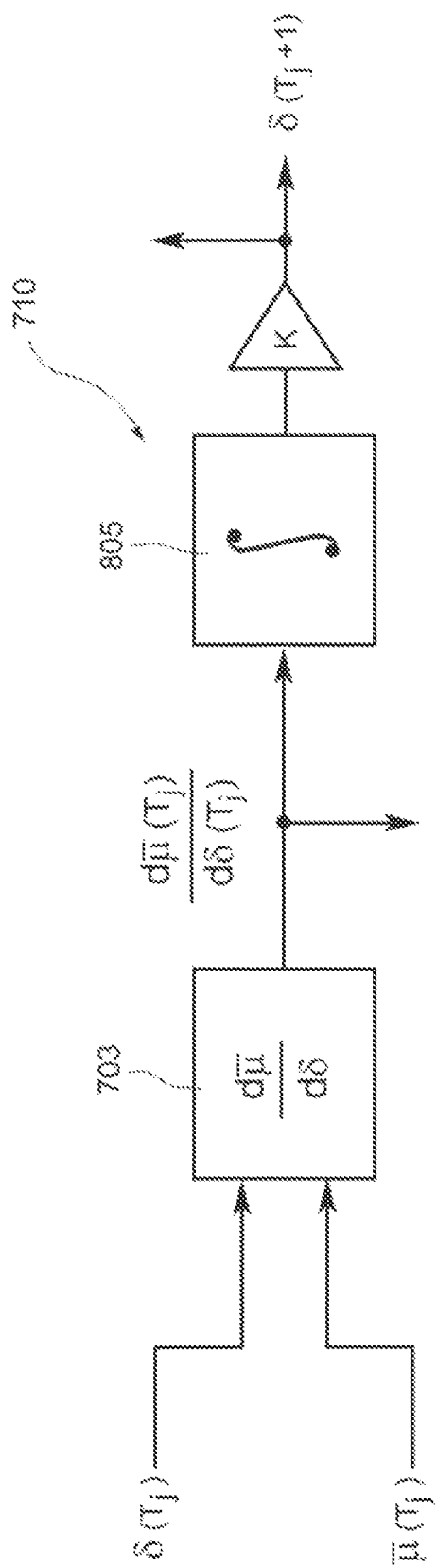
FIGS. 8 and 9 are block diagrams of two alternative embodiments of systems for continuously tracking the average adhesion peak value.

A simplified implementation of the group of modules included in the dashed line block 710 of FIG. 7 is illustrated in FIG. 8, where the block 705, which implements the LMS algorithm, is replaced with a simple integrator 805, the output of which, amplified with a gain K, generates the target-slip value $\delta(T_{j+1})$ to be assigned to the adhesion control and recovery system 706 (FIG. 7).

The gain K regulates the identification speed of the average adhesion peak value $\bar{\mu}$ and simultaneously ensures the stability of the closed loop system.

Figure 9:
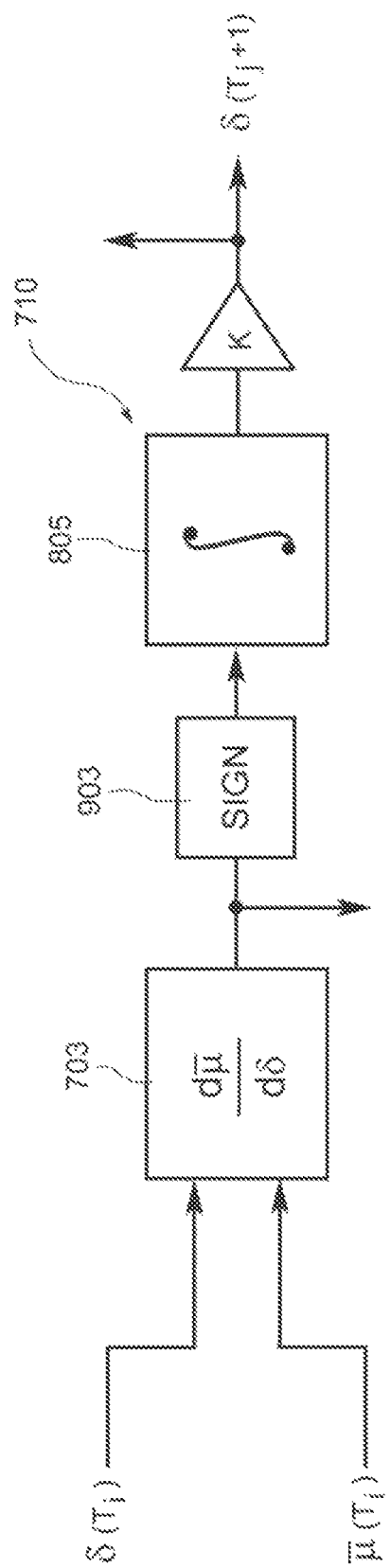

A further simplified variant of embodiment of the dashed block 710 of FIG. 7 is shown in FIG. 9: the module 903 detects the sign of the derivative $$\frac{d\bar{\mu}}{d\delta}.$$

The output of the block 903 being equal to +1 or −1 (the positive and, respectively, negative direction), a subsequent integrator 805 performs simple unitary sums. The integrator 805 may be replaced with an up/down type counter updated with period $T=T_{j+1}-T_j$.

The diagrams according to FIGS. 8 and 9 perform a continuous tracking of the average adhesion peak $\bar{\mu}$, continuously adapting to the change in adhesion conditions, similarly to what was achieved with the diagram according to FIG. 7. The latter allows rapid and accurate tracking of the condition $$\frac{d\bar{\mu}}{d\delta} = 0,$$

but requires the use of a certain number of computations in real time.

The diagram according to FIG. 9 greatly reduces the number of computations necessary, but also reduces the speed of tracking the condition $$\frac{d\bar{\mu}}{d\delta} = 0.$$

The diagram according to FIG. 8 has intermediate characteristics between those of the diagrams according to FIGS. 7 and 9.

Figure 10:
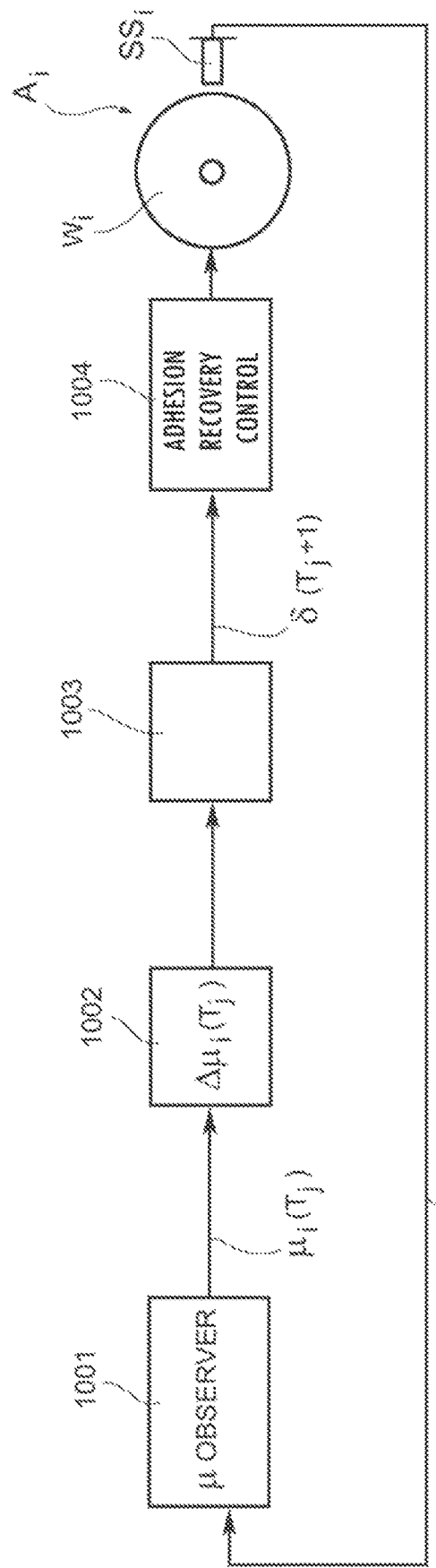
FIG. 10 is a block diagram of another system for implementing a process or method according to the present invention.

FIG. 10 illustrates a further system for the implementation of a method according to the present invention, wherein the difference between the greater and lesser adhesion value between the controlled axles in the generic period $T_j$ is analyzed in real time:

$$\Delta\mu(T_j)=\mu_{max}(T_j)-\mu_{min}(T_j) \quad (10)$$

and the value $\delta(T_{j+1})$ is obtained on the basis of a curve obtained from experimental data, as better described below.

With reference to FIG. 10, an adhesion observer 1001, similar to the observer 701 of FIG. 7, receives the values of the speeds $\omega_i$ of the wheels $W_i$ of controlled axles $A_i$, together with a vector of the values of the magnitudes previously described, necessary for the estimation of the corresponding adhesions $\mu_i(T_j)$. A module 1002 receives from the adhesion observer 1001 the values of the instantaneous adhesions $\mu_i(T_j)$ and outputs the value of $\Delta\mu(T_j)$, according to the equation (10) given above.

A subsequent module 1003 receives as input the value of $\Delta\mu(T_j)$ and outputs the value of $\delta(T_{j+1})$ to be assigned to the control and adhesion recovery module 1004, similar to the module 706 of FIG. 7 and having, for example, the configuration shown in FIG. 2.

Appropriately, the module 1003 may have a transfer function with hysteresis according to the graph shown in FIG. 11: this transfer function defines a relationship between the slip $\delta$ and the adhesion variation $\Delta\mu$, the graph of which has essentially the shape of a polygon, bounded below by a straight horizontal line, $\delta=\delta_x$ with $\delta_x$ typically (but not necessarily) equal to 0.05 and bounded above by a horizontal straight line, $\delta=\delta_y$, with $\delta_y$ typically (but not necessarily) equal to 0.35. The transfer function can thus generate $\delta$ values between $\delta_x$ and $\delta_y$.

If the adhesion control and recovery module 1004 must fully comply with regulatory requirements (EN 15595, :2009+A1, cited above), then the $\delta_y$ value must abide by the requirements in paragraph 6.3.2.2 of said standard.

If during a sliding phase for a given $\delta$ value, a reduction of adhesion $\Delta\mu$ is observed tending to cause the point of work to migrate out horizontally through the left oblique rectilinear side of the aforementioned polygon, the transfer function will determine the new value of $\delta(\Delta\mu)$ descending along this oblique rectilinear side. Similarly, if, during a skidding phase for a given $\delta$ value, there is an increase of $\Delta\mu$ tending to cause the point of work to migrate out horizontally through the right oblique side of the polygon, the transfer function will determine the new value of $\delta(\Delta\mu)$ rising along the right oblique rectilinear side of the aforementioned polygon.

The hysteresis of the transfer function is required to provide stability to the system, which otherwise would tend to oscillate due to the significant propagation delay in the loop.

The oblique rectilinear sides of the polygon converge between them toward the bottom, reducing the hysteresis in the vicinity of the origin of the coordinate axes, in order to make the system very sensitive to small variations of $\Delta\mu$ when the system is to work in conditions of $\delta\approx\delta_x$, as in the situation to which the graph of FIG. 6A refers.

Figure 11:
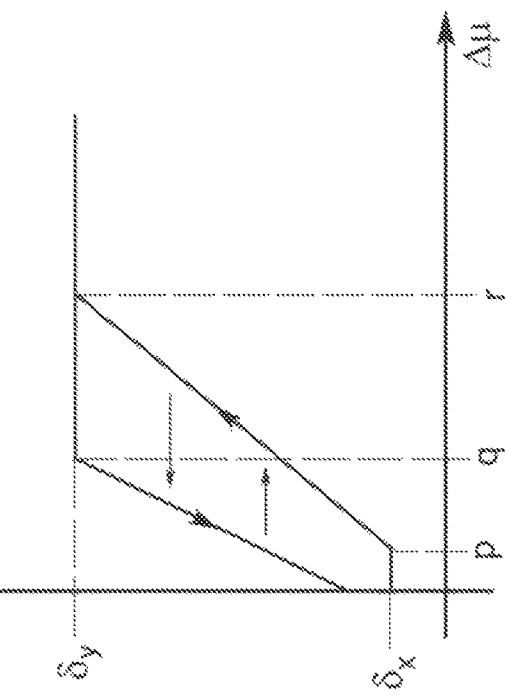
FIG. 11 is a graph of a transfer function with hysteresis used in the implementation of the method according to the invention.

In FIG. 11, the values p, q, r, which represent the x-coordinates of vertices of the aforementioned polygon, are determined experimentally and have for example approximately the values p=0.01, q=0.03 and r=0.05.

The module 1003 computes $\delta(T_{j+1})$ with a period T $(=T_{j+1}-T_j)$, ensuring an adjustment in time of the $\delta$ value to the environmental conditions.

A further implementation of the method according to the present invention may provide for the generation of the value of $\delta(T_j)$ according to a real-time processing of the values of $\bar{\mu}(T_j)$, $\Delta\mu(T_j)$ and $\delta(T_j)$ by means of a fuzzy logic algorithm, intended to generate the value of $\delta(T_{j+1})$ to be assigned to the adhesion control/recovery module 706 of FIG. 7.

Each manner of implementing the method according to the invention described above in skidding phase forces all the controlled axles to slip about the value $\delta$. In fact, the last (in the direction of travel) of the controlled axles that is still in the skidding condition, no longer having the function of cleaning the rails for any subsequent axles (since it is the last of the axles, or further subsequent axles being in the condition of complete adhesion) may be held in controlled slipping on the adhesion peak value lying on the curve A of FIG. 4 by further increasing the value of $\bar{\mu}(T_j)$.

Figure 4:
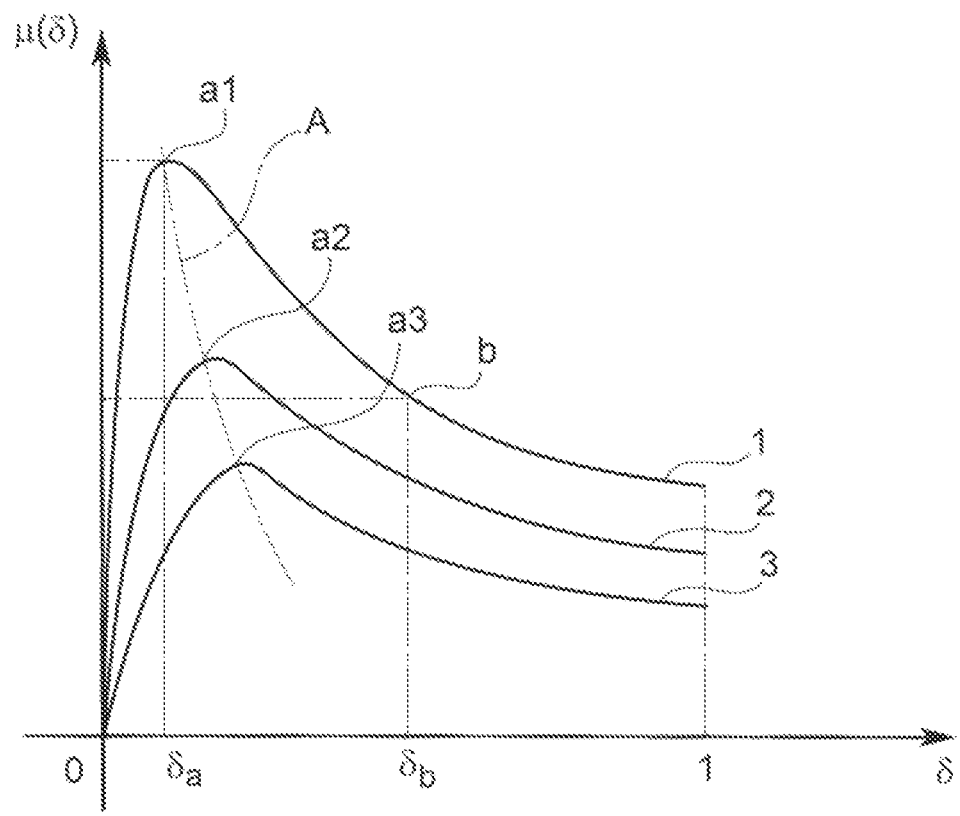
FIG. 4 is a graph showing qualitatively the trend of the adhesion coefficient μ of the wheels of an axle, shown on the y-axis, as a function of the slip δ, shown on the x-axis.

Such action simply cannot be done by forcing on the concerned axle a specific value of $\delta$ corresponding to the points of the curve A of FIG. 4, since this curve is unknown a priori and varies continuously with time.

Figure 12:
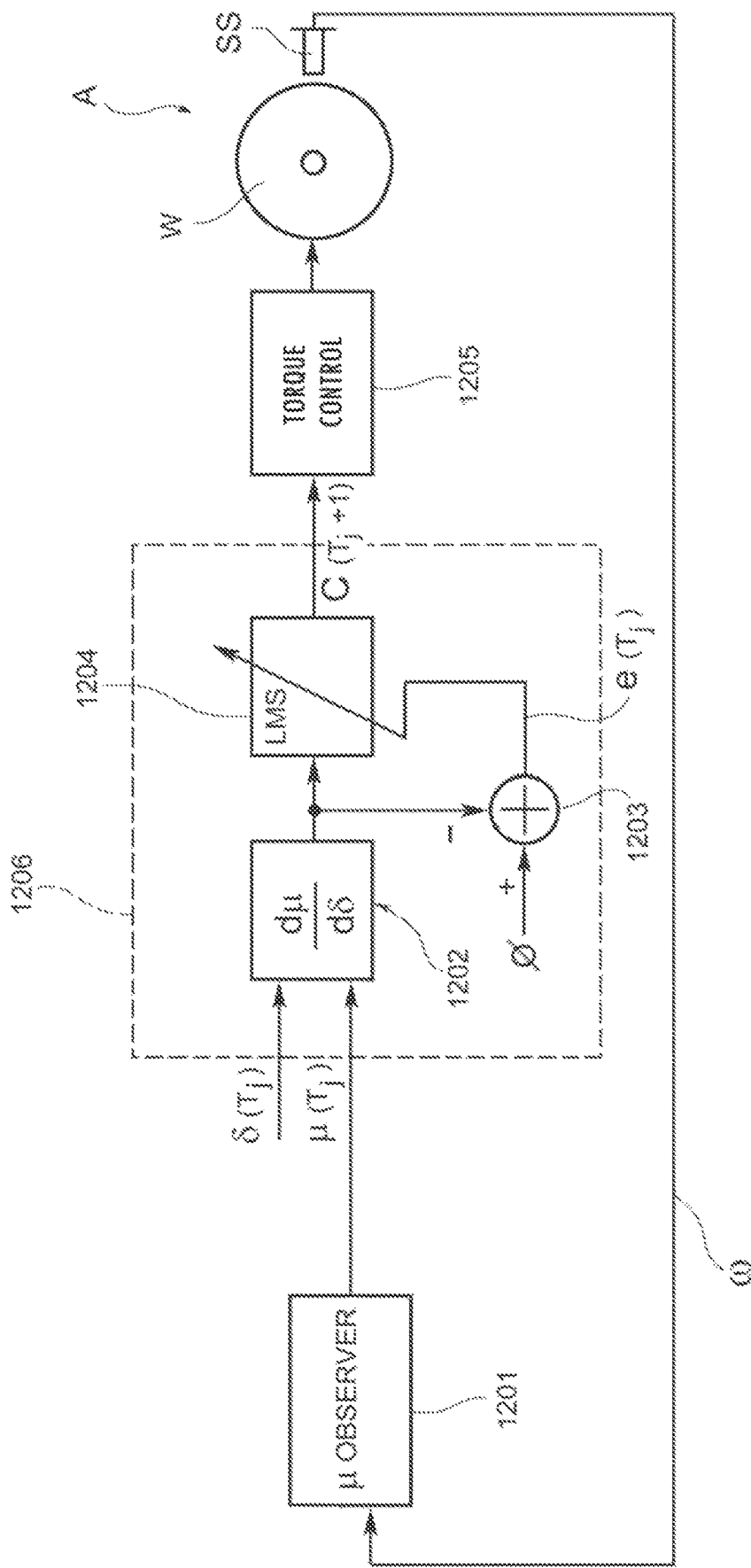
FIG. 12 is a block diagram of a variant of embodiment of a system for implementing the method according to the present invention.

To maintain this axle in controlled slipping on the adhesion peak value, as is shown in FIG. 12, an adhesion observer 1201 receives signals indicative of the wheel speed W of this controlled axle, simultaneously with a value vector of the magnitudes, previously described, necessary for estimating the instantaneous adhesion $\mu$ of this axle.

A subsequent module 1202 computes the value of the derivative $$\frac{d\mu}{d\delta},$$

when the value of $\delta$ is obtained in real time in accordance with the equation (1').

Figure 3:
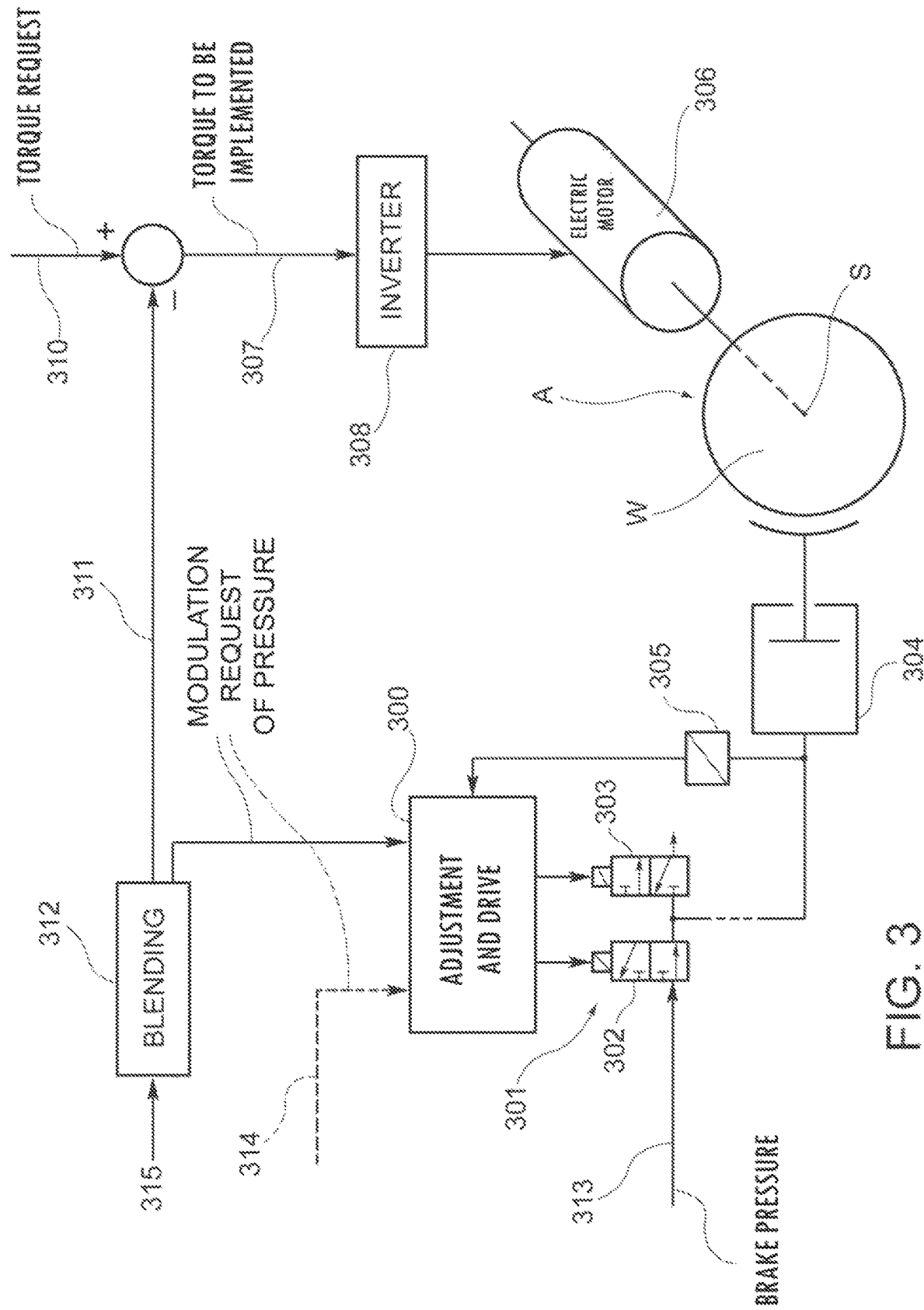
FIG. 3 is a diagram of a possible embodiment of an apparatus for controlling the torque applied to an axle.

An adder 1203 outputs the error $e(T_j)$ as the difference between the desired value of said derivative (i.e., the value 0) and the instantaneous value computed by the module 1202. This error is used to adapt the LMS algorithm implemented in a block 1204. The latter outputs a torque request $C(T_{j+1})$ for said axle, which is transmitted to a torque control module 1205, having, for example, the architecture described above with reference to FIG. 3.

In a manner known per se, the module 1204 continuously corrects the output $C(T_{j+1})$ in order to minimize or cancel the error e(T), i.e. in order to obtain a cancellation of the aforementioned derivative, that is in order to bring said axle to the adhesion peak value and maintain it there.

The dashed block 1206 of FIG. 12 may possibly be simplified as described above in relation to FIG. 7 and the relative simplifying variants illustrated in FIGS. 8 and 9.

The solution according to FIG. 12 allows the real value of the maximum available adhesion for a given axle to be measured.

By applying this solution to two axles, for example, the first axle in the direction of travel and the last axle in the skidding condition, and finding the difference between their adhesions, the value to be assigned as the difference in adhesion $\Delta\mu$ in the embodiment illustrated in FIG. 10 may be obtained, in substitution of the blocks 1001 and 1002 illustrated herein.

The solution according to FIG. 12 may also be used to identify the direction of travel of the vehicle: at the beginning of a skidding phase, the solution according to FIG. 12 is applied for example to the first and last axles of the vehicle and the direction of travel is defined by the axle for which the lower value of adhesion is detected.

Finally, the solution according to FIG. 12 may be used to improve the estimation of the actual speed $V_v$ of the vehicle: in fact, the curve A of FIG. 4 is located in a field to which correspond the x-axis values δ of less than 0.02. The algorithm most used for the estimation of the actual speed $V_v$ of the vehicle, in the event of braking, normally uses a function of the type:

$$V_v(T_j)=\max[S_1(T_j),\ldots,S_n(T_j),(V_v(T_{j-1})+a_{max}\cdot T)] \quad (11)$$

while in case of traction, the following function is used:

$$V_v(T_j)=\min[S_1(T_j),\ldots,S_n(T_j),(V_v(T_{j-1})+a_{max}\cdot T)] \quad (12)$$

where $a_{max}$ is the maximum acceleration permitted for the vehicle in operation, this acceleration having a positive sign in the case of a traction condition and a negative sign in the case of a braking condition.

Therefore, applying the solution according to FIG. 12 to at least one axle, said axle will always advance at a linear speed equal to that of the vehicle (less than a maximum error computable as 2%), even in degraded adhesion conditions. Therefore, the above two expressions provided always allow a very reliable value of the vehicle's speed $V_v$ to be provided, even in very degraded adhesion conditions.

Naturally, without altering the principle of the invention, the embodiments and the details of implementation may vary widely with respect to those described and illustrated purely by way of non-limiting example, without thereby departing from the scope of the invention as defined in the appended claims.

The invention claimed is:

1. A method for controlling and recovering adhesion of wheels belonging to at least two controlled axles of a railway vehicle, during a wheel skidding phase, comprising the steps of:
generating speed signals indicative of an angular speed of said wheels;
estimating values of an instantaneous adhesion at a point of contact of said wheels and the rails, using an adhesion observer;
generating a target-slip value for the wheels of said at least two axles by means of an optimization algorithm which processes the estimated values of the instantaneous adhesion, and modifying said target-slip value continuously in time, with a predetermined sampling period, such as to maximize an average value of the adhesion of the wheels of the vehicle.

2. A method according to claim 1, wherein a derivative of the average value of the adhesion of the wheels of said axles as a function of variation of the target-slip value of said wheels is computed, and through an adaptive filter the target-slip value for a subsequent sampling interval is modified, such as to make said derivative go to zero and to maximize the average value of the adhesion of the wheels of said axles.

3. A method according to claim 1, wherein a derivative of the average value of the adhesion of the wheels of said axles as a function of variation of the target-slip value of said wheels is computed and thereafter integrated by means of an integrator with an output of which modifies the target-slip value and becomes stable when said derivative is equal to zero and when the average value of the adhesion of said axles tends to a maximum value of the average value of the adhesion.

4. A method according to claim 1, wherein a sign of a derivative of the average value of the adhesion of the wheels of said axles as a function of variation of the target-slip value of said wheels is computed and thereafter integrated by means of an integrator with an output of which modifies the target-slip value and becomes stable when said derivative is equal to zero and when the average value of the adhesion of said axles reaches a maximum value of the average value of the adhesion.

5. A method according to claim 1, wherein a value of a difference between a maximum value of the adhesion of the wheels of said controlled axles and and a minimum adhesion of the wheels of said controlled axles are computed and through a predetermined function with hysteresis, which links the target-slip value with the adhesion, the target-slip value is modified and stabilized about a maximum value of the average value of the adhesion.

6. A method according to claim 1, wherein the average value of the adhesion a maximum variation of the adhesion and the target-slip value are computed, and through fuzzy logic devices, a subsequent value of the target-slip value, is generated, to be assigned to an adhesion recovery module.

7. A method according to claim 1, wherein a last skidding axle of the axles, with respect to a direction of travel, is maintained in a condition of controlled slipping at a peak value of the adhesion that is available.

8. A method according to claim 7, wherein in order to maintain at least one of the axles in a condition of skidding at a peak value of the adhesion that is available, a control algorithm for said at least one of the axles is used, wherein on a basis of the adhesion the at least one of the axles, a derivative of the adhesion as a function of the target-slip value is computed, and through an adaptive filter a torque value to be assigned to a system for controlling a torque applied to the at least one of the axles is modified, such as to keep said derivative substantially at zero.

9. A method according to claim 7, wherein in order to keep said last skidding axle in a condition of skidding at the peak value of the adhesion, a control algorithm for each of the axles is used, wherein a sign of the derivative of the adhesion as a function of the target-slip value is value computed and thereafter integrated by means of an integrator, an output of which modifies a torque value to be assigned to a system for controlling the torque applied to the last skidding axle, such as to make said derivative substantially equal to zero.

10. A method according to claim 1, wherein a vehicle speed is computed by means of an instantaneous speed of at least one of the axles which is skidding, said at least one axle which is skidding being kept in a condition of controlled slipping at a peak value of the adhesion that is available.

11. A method according to claim 1, wherein at least two of the axles which are skidding are maintained in a condition of controlled slipping at a peak value of the adhesion that is available for determining a direction of travel of the vehicle.

12. A method according to claim 1, applied during a condition of skidding in a traction phase, or in a condition of slipping in a braking phase.

* * * * *